United States Patent

[11] 3,570,400

[72] Inventors Vincent Squitieri
128 Salem Road, Billerica, Mass. 01821;
Dick J. Wollmar, Old Winter St., South
Lincoln, Mass. 01773
[21] Appl. No. 840,878
[22] Filed Apr. 18, 1969
Division of Ser. No. 462,446, June 18, 1965,
Pat. No. 3,483,074.
[45] Patented Mar. 16, 1971

[54] MATRIX MATERIAL FOR MOLDING DUPLICATE PRINTING PLATES
4 Claims, No Drawings
[52] U.S. Cl......................................................... 101/401.2,
161/138
[51] Int. Cl...................................................... B41d 3/00,
B41n 11/00
[50] Field of Search........................................... 101/401.1,
401.2, 426 (FAX), 458, 460, 463, 177, 17;
161/214, 138, 400; 204/6

[56] References Cited
UNITED STATES PATENTS

| | | | |
|---|---|---|---|
| 2,103,764 | 12/1937 | Boutwell...................... | 101/401.2 |
| 2,172,563 | 9/1939 | Libberton..................... | 204/6 |
| 2,509,499 | 5/1950 | Higgins......................... | 18/47.5 |
| 2,629,907 | 3/1953 | Hugger......................... | 22/200 |
| 2,768,133 | 10/1956 | Lundbye....................... | 204/20 |
| 3,015,268 | 1/1962 | Garrett......................... | 101/401.1 |
| 3,145,654 | 8/1964 | Johnson et al................ | 101/401.1 |
| 3,260,657 | 7/1966 | Hogan........................... | 204/6 |

Primary Examiner—Robert E. Pulfrey
Assistant Examiner—E. M. Coven
Attorneys—Philip G. Kiely and J. Richard Geamon ABSTRACT: A printing plate matrix and a process for making it where a fibrous base material is impregnated with a heat-cured resin and a thin thermoplastic film is bonded to one face of the base. The exposed face of the film has a metallic coating on it and bears an intaglio reproduction of the face of a printing form.

MATRIX MATERIAL FOR MOLDING DUPLICATE PRINTING PLATES

This is a division of application Ser. No. 462,446, filed Jun. 8, 1965, now U.S. Pat. No. 3,483,074.

This invention relates to printing and more particularly to a matrix for electrotypes and for molding plastic and rubber printing plates and a method of preparing such a matrix.

A matrix for the production of plastic and rubber printing plates generally comprises a base or support material impregnated with a thermosetting resin and a layer of filled, heat-curing resin. The aforementioned matrix must be capable of receiving and retaining an exact reproduction of the face of a printing form. The matrix, bearing an intaglio reproduction of the face of the printing form, can then be used to produce many identical printing plates.

In the past, matrices for the production of duplicate printing plates have been prepared from a blank comprising fibrous board or base materials which have been impregnated with a heat-curing phenolic resin, e.g., a phenol-formaldehyde resin. The face of the base material generally comprises a layer of a filled, heat-curing resin which, when subjected to heat and pressure during the superposition of a type form against said layer, would flow and compress sufficiently to receive an impression corresponding to the face of the printing form, and then harden, maintaining the thus-formed impression.

The prior art matrices suffered from a number of drawbacks. For example, a release material, such as a silicone or graphite spray, had to be applied to the surface of the matrix prior to the formation of the duplicate plate in order to provide ready, uniform release of the duplicate plate. In the formation of the intaglio reproduction on the surface of the matrix, a certain degree of nonuniformity was introduced into the surface of the heat-cured resin. Such nonuniformity may be manifested in extreme thinness of the layer, pinholes, or breaks in the surface, particularly where sharp edges and indentations were formed in said surface and where the surface layer had been extended beyond its plastic flow limit. The rubber or plastic material of the duplicate printing plate would readily penetrate such openings in the surface and adhere or bond to the phenolic-fiber base material. When the matrix and printing plate were separated, a portion of the duplicate plate material would adhere to the matrix, thereby forming an imperfection in the duplicate plate which would become readily apparent and objectionable and, in some cases, unuseable, when the duplicate plate was used in printing. The above-described adherence of the duplicate plate material to the matrix is generally referred to as "picking." The prior art matrices were subject to warp and one dimensional shrink. The thickness was approximately 0.09 to 0.2 inch, and the compression was about 30 to 40 percent at 500 to 1,000 p.s.i.

A molded matrix has now been found which is not subject to the failings of the prior art materials and which also possesses a number of unexpected advantages. The laminated blank for forming the novel matrix of the present invention comprises a compressible fibrous base material which has been impregnated with a thermosetting material and, laminated to one face of the compressible base material, a high-melting, i.e., at least about 200° C., continuous, unsupported, thermoplastic film which is compatible with the thermosetting impregnant in the base, and which has a thin, highly electrically conductive metal layer deposited on the surface. As examples of suitable films, mention may be made of nylon, polytetrafluoroethylene, polycarbonate (polymeric combinations of bifunctional phenols or bisphenols, linked together through a carbonate linkage), polypropylene, polyethylene terephthalate, and polyethylene which contains a heat-activated cross-linking agent. The preferred thermoplastic films for use in the matrices of this invention are high melting, unsupported polyamide films (nylons) and heat cross-linkable, low density polyethylene. The preferred polyamide is nylon 6. The polyethylene film preferably contains a filler. Copending application Ser. No. 440,298, filed March 16, 1965, is directed to the use of such films on a compressible base material, and the disclosure of said application is incorporated herein to the extent applicable.

As examples of highly conductive metals suitable for use in the present invention, mention may be made of aluminum, silver, gold, and copper. The coating of films with thin layers of metals is well known to the art. A preferred method of preparing metallized films for use in the present invention is by the vacuum deposition of the metal on the film. In the art the thickness of the metal coating on the film is measured in ohms per square. The thickness of the metal coating is inversely proportional to its electrical resistance; therefore, 1 ohm per square is normally equal to one-millionth of an inch on a smooth surface. Metallized films suitable for use in the present invention have a coating which ranges from 0.1 to 10 ohms per square in resistance. In a preferred embodiment metallized nylon having a silver coating of 1.3 ohms per square is employed.

The thermoplastic properties of the films permit the films to readily flow or distort, assuming accurately the shape of the type form and, at the same time, maintaining film continuity and coherency while the impression is being made, thereby eliminating the formation of stresses and the possibility of rupture of the film layer. The melting point of the film is sufficiently higher than the molding temperature to prevent loss of the film structure by melting while the thermoplastic property permits the film to distort to follow the depressions in the type form. The film materials of the present invention are heat stable to temperatures well in excess of temperatures normally utilized in molding duplicate plates; in the case of some nylons 100 to 125° F. in excess. Therefore, the possiblity of exceeding the plastic flow limit of the surface layer is remote in the present invention. The compatibility of the impregnant in the base and film insures a unitary structure providing for a firm, stable base for the film layer and good adhesion between the material which prevents displacement or separation of the film layer on the base material, thereby retaining accuracy in the reproduction even throughout the preparation of many duplicate plates.

The novel matrix material of may present invention is particularly useful in electrotypes. In preparing printing plates for electrotype a mold is first made of the original printing plate. This mold is then sprayed with a silver spray in order to provide the necessary conductivity for the electrolytic deposition of the copper. By employing the novel matrix material of the present invention, the second step in the operation, the spraying with silver, may be eliminated. The novel matrix material of the present invention may be utilized to prepare an intaglio image of the original plate on which the copper is deposited directly from the electrolytic bath without the intermediate application of the silver layer.

In the novel matrix board of the present invention, the metallized film may be applied to the fibrous material with either the metallized surface in the upper or exposed position or in a position on the film next to the fibrous base material. When the uncoated side of the film is in the uppermost position and the film is transparent, the metallized layer performs a decorative function. When the metallized layer is uppermost, that is, in the preferred embodiment, the metallized layer functions as a release agent or in the case of electrotypes, as the conductive layer.

By using less dense materials, the instant matrices can be formed as thin as 0.08 of an inch while at the same time providing approximately 50 to 60 percent compression as compared with about 30 to 40 percent for prior art materials. While blanks 0.08 to 0.09 inch in thickness are preferred, blanks any thickness can be prepared.

Baseboards having a density of 8 to 10 are preferred for use in this invention. Density is determined by dividing ream weight in pounds (500 sheets 24 ± 36 inches) by the caliper of the sheet in thousandths of an inch. The shrink of the matrices of the present invention is not appreciable; therefore, distortion of the duplicate plates formed from the matrices is minimized. Shrinkage in prior art materials of 0.5 percent in one direction is common. The resin in the base material can be cured in approximately half the time required for the prior art materials due to the use of a thinner board, thereby shortening the time required to form a matrix.

One of the most important advantages of the present invention is the self-contained release characteristics of the metallized films of the present invention which makes unnecessary the use of a release compound and the attendant problems of applying a uniform and complete layer of said release compound to the matrix surface.

The preferred thermosetting resin for use in impregnating the fibrous base material is a blend of low residual formaldehyde phenolic resin and butadiene-acrylonitrile latex suspended in water. The most desirable balance of strength and flexibility has been found in the phenolic to butadiene-acrylonitrile ratio of 9 to 1. The solids (resin)-to-fiber ratio in the base material preferably ranges from 0.45 to 0.60. Other thermosetting resins known to the art, such as phenolic or resorcinol resins, may be used as the impregnant in the base material.

The matrix base material comprises a resinized paperboard consisting of a heat-curing phenolic resin and fibrous material having a solids-fiber ratio preferably ranging from 0.45 to 0.60. The fibrous material is preferably a combination of wood flour and cellulosic fibers. The base material may be formed by a process which involves the suspension of finely divided particles of the resin in the beater of a paper machine with a substantial portion of paper pulp. This combination is then thoroughly mixed and suspended in water and the mixture is fed to a paperboard making machine which forms the material as a sheet of comparatively low density. The sheet is then dried until the residual moisture of volatile matter is not more than about 4 percent. Such resinized paperboard is known to the art as "Premix Board" and "Rogers Board."

The base material may also be formed from a stack of impregnated soft paper or pulp. This can be accomplished by conveying uniform sheets of pressed sulfite pulp through a bath of the phenolic resin-in-water solution. When such a water solution has a solids content of about 20 to 30 percent, the viscosity is low and penetration of the pulp is sufficiently complete. The impregnated web of sulfite pulp is drawn between squeeze rolls and is then conveyed through a drying oven to evaporate the water and to give the phenolic resin a suitable procure.

The base material may also be formed by conveying a wet sheet of paper pulp through a water bath containing the phenolic resin. After penetration of the fibers of the pulp with the phenolic solutions, the sheet is pressed between squeeze rolls and then passed into an oven in order to reduce the moisture content to the desired level.

The films may be applied to the base material by laminating methods known to the art. In order to provide optimum bonding, a thin layer of adhesive such as the thermosetting resin utilized in the base may be applied to the surface of the base or to the film prior to laminating. Adhesion may be facilitated by calendering the base and thermoplastic film with the application of heat and pressure. Care should be taken to prevent the absorption of moisture from the resin coating by the film material which may result in the distortion of the film. The use of a thin, high solids coating on the back of the film and a low moisture base as well as rapid processing is desirable in avoiding the aforementioned moisture takeup. Adhesives known to the art are employed and are generally chosen with due consideration to the particular film being laminated.

The films employed in the surface matrix of the present invention are 1 to 3 mils in thickness. Preferably 1- and 2-mil films are employed. Films in excess of 3 mils are undesirable due to excessive cost and inability to retain fine line screen reproductions with shallow relief.

The following nonlimiting examples illustrate the preparation of the novel blank of the present invention.

EXAMPLE 1

A layer of 0.5 mil of phenol formaldehyde lacquer was applied to a 2-mil film of nylon 6 having a vacuum deposited layer of silver (0.14 ohms per square) on one surface. The dried, coated nylon was then laminated at a temperature of about 250° C. to a 0.09-inch board comprising 67 percent cotton linters and 32 percent phenol formaldehyde resin. Sufficient pressure was applied during lamination to compress the board 0.01 inch.

EXAMPLE 2

A blank was prepared as in example 1 using the same materials except that the silver layer had a thickness of 0.3 ohms per square.

EXAMPLE 3

A blank was prepared as in example 1 using the same materials except that the silver layer was 1.3 ohms per square. The above blank exhibited excellent film bonding and functioned satisfactorily during molding and during reproduction of duplicate plates from the matrix.

The above blanks functioned satisfactorily during molding and during the production of duplicate plates from the molded matrix.

In the molded matrix of this invention a uniformity in the depth of depressions throughout the entire area of the matrix was noted. A variation in depth of not greater than ± 0.0005 inch is found in matrices of the present invention. The variation normally found in prior art matrices is ± 0.001 inch.

In forming a matrix for preparing duplicate printing plates from a blank of the present invention, a metal type form is preheated to approximately 300 to 350° F. and placed in contact with the surface of the matrix. A hydraulic press holds the matrix and form forced together for a time sufficient to cure the thermosetting resin in the base material, generally about 5 to 8 minutes. The matrix, bearing an exact intaglio reproduction of the face of the type form, is then removed and is ready to be used in forming duplicate printing plates.

We claim:

1. A matrix for the production of duplicate printing plates comprising a fibrous base material having a fiber density lying between 8 and 10 impregnated with a heat-cured resin, a continuous thermoplastic film between 1 and 3 mils thick having a melting point of at least 200° C, bonded to one face of the said base material, and the said film having a metallic adherent coating on one face thereof selected from the class of metals consisting of silver, gold, copper, and aluminum, the resistance of the said film being between 0.1 and 10 ohms per square, the thermoplastic film together with the impregnated fibrous base bearing an intaglio reproduction of the face of a printing form.

2. A product as defined in claim 1 wherein said film is nylon and said metal is silver 3. The method of preparing a matrix for the production of duplicate printing plates which comprises laminating a continuous, unsupported metallic-coated thermoplastic film having a melting point of at least 200° C. to one face of an impregnated compressible felt, the said metallic coating being a metal selected from the class consisting of aluminum, silver, gold, and copper, in such thickness as to present an electrical resistance lying between 0.1 to 10 ohms per square, the said impregnated compressible felt having a felt density lying between 8 and 10 the said impregnant being a thermosetting resin in the proportion of 0.45 to 0.6 resin solids to fiber, pressing the thermoplastic face of the laminate against the face of a type form heated to a temperature sufficient to cause the thermosetting impregnant to cure and permit the thermoplastic to mold about the type, cooling the laminate and the type to a temperature at which the thermoplastic is solid, and then removing the so-made matrix from the face of the type.

4. The method as defined in claim 3 wherein said film is nylon and said metal is silver.